United States Patent [19]

Wagner

[11] Patent Number: 4,961,530
[45] Date of Patent: Oct. 9, 1990

[54] ENGINE COOLING SYSTEM, STRUCTURE THEREFOR AND METHODS OF MAKING THE SAME

[75] Inventor: Joseph P. Wagner, Knoxville, Tenn.

[73] Assignee: Robert Shaw Controls Company, Richmond, Va.

[21] Appl. No.: 418,859

[22] Filed: Oct. 10, 1989

Related U.S. Application Data

[62] Division of Ser. No. 252,693, Oct. 3, 1988, Pat. No. 4,890,790.

[51] Int. Cl.⁵ .............................................. F01P 7/02
[52] U.S. Cl. .................................... 236/34.5; 236/100; 403/305
[58] Field of Search ......................... 236/34, 34.5, 100; 403/305

[56] References Cited

U.S. PATENT DOCUMENTS

| | | | |
|---|---|---|---|
| 2,833,478 | 5/1958 | Middleton | 236/34 |
| 2,984,853 | 5/1961 | Williams | 403/305 X |
| 3,313,483 | 4/1967 | Nallinger | 236/34.5 |
| 3,907,199 | 9/1975 | Kreger | 236/34.5 X |
| 4,522,334 | 6/1985 | Saur | 236/34.5 |
| 4,537,158 | 8/1985 | Saur | 236/34.5 X |
| 4,550,693 | 11/1985 | Saur | 236/34.5 X |
| 4,674,679 | 6/1987 | Saur | 236/34.5 |

*Primary Examiner*—William E. Tapolcai
*Attorney, Agent, or Firm*—Candor, Candor & Tassone

[57] ABSTRACT

An engine cooling system, structure therefor and methods of making the same are provided, the system comprising a housing having an inlet and an outlet, and a thermostat construction disposed in the housing between the inlet and the outlet for controlling the degree of fluid flow therebetween, the thermostat construction comprising a valve seat unit, a valve closure unit for opening and closing the valve seat unit, a spring operatively interconnected to the valve closure unit to tend to close the same against the valve seat unit, and a temperature responsive device comprising a piston member and a cylinder member that are adapted to provide relative movement therebetween when the device senses certain temperatures, one of the members being interconnected to the valve closure unit to move the same in unison therewith in opposition to the force of the spring when the other of the members is fixed from movement relative to the housing, and a movable stop carried by the housing and having a plurality of different set positions relative to the other member so as to be engaged by the other member at the particular set position of the stop and thereby fix the other member to the housing at that particular set position so that once the other member has been moved against the stop by the device sensing a particular temperature, the device will cause the one member to move to open the valve closure unit relative to the valve seat unit when the device senses a certain higher temperature than the particular temperature.

5 Claims, 3 Drawing Sheets

ENGINE COOLING SYSTEM, STRUCTURE THEREFOR AND METHODS OF MAKING THE SAME

CROSS REFERENCE TO RELATED APPLICATION

This application is a divisional patent application of its copending parent patent application, Ser. No. 252,693, filed Oct. 3, 1988, now Pat. No. 4,890,790.

BACKGROUND OF THE INVENTION

1. Field of the Invention

This invention relates to a new engine cooling system and to new structure therefor as well as to new methods of making such a system and such structure.

2. Prior Art Statement

It is known to provide an engine cooling system comprising a housing means having an inlet and an outlet, and a thermostat construction disposed in the housing means between the inlet and the outlet for controlling the degree of fluid flow therebetween, the thermostat construction comprising a valve seat unit, a valve closure unit for opening and closing the valve seat unit, spring means operatively interconnected to the valve closure unit to tend to close the same against the valve seat unit, and a temperature responsive device comprising a piston member and a cylinder member that are adapted to provide relative movement therebetween when the device senses certain temperatures, one of the members being interconnected to the valve closure unit to move the same in unison therewith in opposition to the force of the spring means when the other of the members is fixed from movement relative to the housing means. For example, see the Wagner et al, U.S. Pat. No. 4,548,354.

It was suggested by others that it would be desirable to provide a cooling water thermostat for an engine cooling system that will control at two different temperatures, such as one for summer driving and one for winter driving or one for heavy engine loads and one for normal driving. However, no structure was suggested for accomplishing this feature.

It is also known to provide a piston and cylinder temperature responsive device that will operate in two different temperature ranges. For example, see the Schwartz U.S. Pat. No. 3,438,256; the Schwartz U.S. Pat. No. 3,381,469 and the Jackson et al, U.S. Pat. No. 3,989,058.

It is also known to provide an electrical heater in combination with a piston and cylinder temperature responsive device for causing the piston member to be extended relative to the cylinder member when the electrical heater means is being operated. For example, see the Noakes et al, U.S. Pat. No. 3,696,611; the Cook et al, U.S. Pat. No. 4,666,081 and the Nouvelle et al, U.S. Pat. No. 4,685,651.

SUMMARY OF THE INVENTION

One feature of this invention is to provide a new engine cooling system wherein the thermostat construction thereof will control at different selected temperature ranges.

In particular, it was found according to the teachings of this invention that a movable stop means could be provided and be set at different positions thereof so as to be engagable by one member of a temperature responsive means of a thermostat construction to fix that one member relative to a housing means and thereafter permit the other member of the thermal responsive device to then move a valving means to its open position upon the temperature responsive device sensing a higher temperature than the temperature that placed the one member thereof in engagement with the stop means.

In this manner, it was found that the thermostat construction would control at different temperature ranges depending upon the setting of the stop means for that thermostat construction.

For example, one embodiment of this invention provides an engine cooling system comprising a housing means having an inlet and an outlet, and a thermostat construction disposed in the housing means between the inlet and the outlet for controlling the degree of fluid flow therebetween, the thermostat construction comprising a valve seat unit, a valve closure unit for opening and closing the valve seat unit, spring means operatively interconnected to the valve closure unit to tend to close the same against the valve seat unit, and a temperature responsive device comprising a piston member and a cylinder member that are adapted to provide relative movement therebetween when the device senses certain temperatures, one of the members being interconnected to the valve closure unit to move the same in unison therewith in opposition to the force of the spring means when the other of the members is fixed from movement relative to the housing means, and a movable stop means carried by the housing means and having a plurality of different set positions relative to the other member so as to be engaged by the other member at the particular set position of the stop means and thereby fix the other member to the housing means at that particular set position so that once the other member has been moved against the stop means by the device sensing a particular temperature, the device will cause the one member to move to open the valve closure unit relative to the valve seat unit when the device senses a certain higher temperature than the particular temperature.

Accordingly, it is an object of this invention to provide a new engine cooling system having one or more of the novel features of this invention as set forth above or hereinafter shown or described.

Another object of this invention is to provide a new method of making an engine cooling system, the method of this invention having one or more of the novel features of this invention as set forth above or hereinafter shown or described.

Another object of this invention is to provide a new structure for an engine cooling system, the structure of this invention having one or more of the novel features of this invention as set forth above or hereinafter shown or described.

Another object of this invention is to provide a new method of making such a structure for an engine cooling system, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
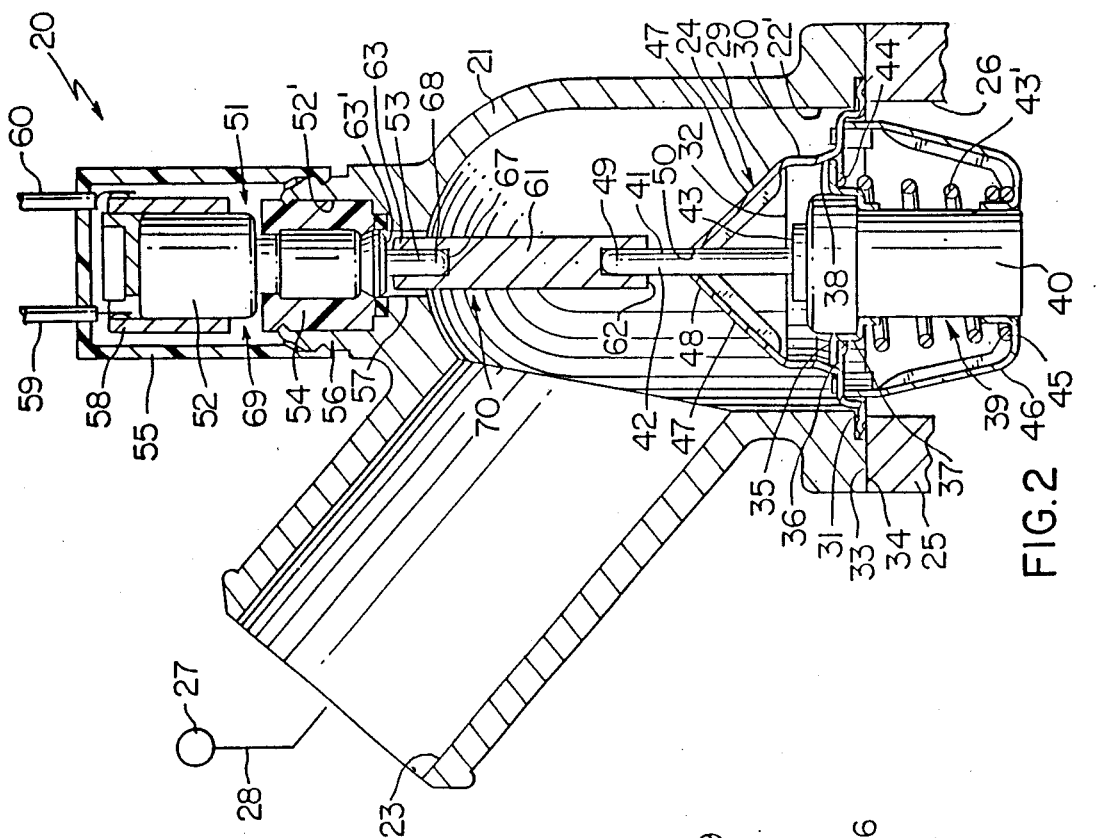
FIG. 1 is a fragmentary cross-sectional view illustrating the new engine cooling system and the new structure of this invention.

While the various features of this invention are hereinafter described and illustrated as being particularly adapted to provide a new engine cooling system and new parts therefor, it is to be understood that the various features of this invention can be utilized singly or in various combinations thereof to provide structure for other types of systems as desired.

Therefore, this invention is not to be limited to only the embodiment illustrated in the drawings because the drawings are merely utilized to illustrate one of the wide variety of uses of this invention.

Referring now to FIGS. 1-6, the new engine cooling system of this invention is generally indicated by the reference numeral 20 and comprises a housing means 21 having an inlet 22 and an outlet 23 and a thermostat construction that is generally indicated by the reference numeral 24, the thermostat construction 24 being disposed in the housing means 21 between the inlet 22 and outlet 23 for controlling the degree of fluid flow therebetween in a manner hereinafter set forth.

The housing means 21 has an internal passage means 22' therein that leads from the thermostat construction 24 to the outlet 23, the housing means 21 being formed of any suitable material and is the embodiment thereof illustrated in the drawings, the housing means 21 is formed of metallic material.

The system 20 also comprises an engine block 25 of an internal combustion engine (not shown) that has a cooling passage means 26 provided therein and being adapted to be fluidly interconnected to the outlet 23 of the housing means 21 by the thermostat construction 24 in a manner herinafter set forth, the housing means 21 being secured to the engine block 25 in any suitable and conventional manner so that the inlet 22 of the housing means 21 is in aligned and in fluid communication with the cooling passage means 26 of the engine block 25.

The engine cooling system 20 also comprises a radiator means 27 that is interconnected to the outlet 23 of the housing means 21 by suitable conduit means 28 in any suitable and conventional manner whereby any of the coolant that is permitted to flow from the cooling passage means 26 of the engine block 25 through the thermostat construction 24 to the radiator 27 can be circulated therein for removing the heat therefrom in a conventional manner and be returned to the cooling passage means 26 of the engine block 25 in a conventional manner.

For example, the details of the structure and the operation of an engine cooling system is fully set forth in the aforementioned Wagner et al, U.S. Pat. No. 4,548,354, whereby this patent is being incorporated into this disclosure by this reference thereto. Also, the thermostat construction 24 is generally of the type that is fully described in the Sliger U.S. Pat. No. 3,719,085, whereby this patent is being incorporated into this disclosure for this reference thereto.

Therefore, only the details of the thermostat construction 24 that are believed necessary to fully understand the various features of the invention will now be described.

Figure 3:
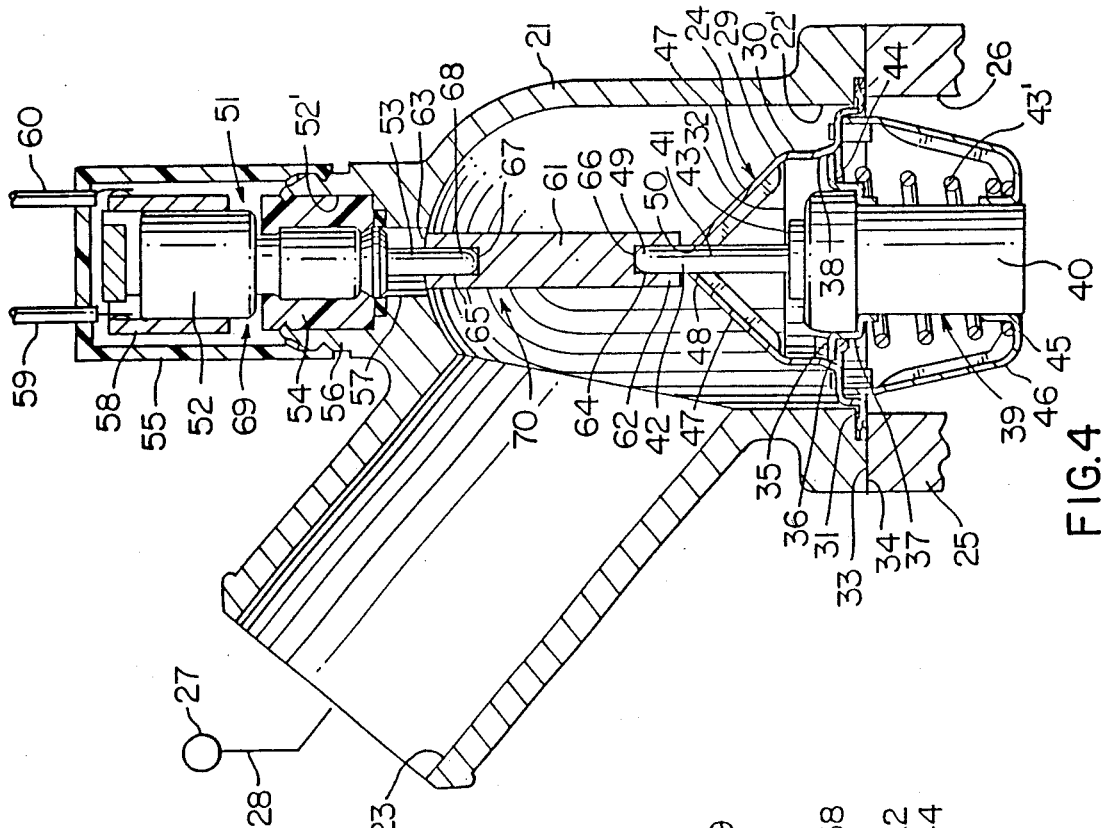
FIG. 3 is a view similar to FIG. 2 and illustrates the system in another operating condition thereof wherein the valve closure unit has been moved to the open position thereof.

The thermostat construction 24 has a valve seat unit 29 that comprises an annular metallic section 30 that terminates in an annular outwardly directed flange 31 at one end thereof and a substantially circular open end 32 at the other end thereof, the annular flange 31 being suitably sealed between the cooperating surfaces 33 and 34 of the housing means 21 and engine block 25 so as to completely span the inlet 22 and prevent fluid flow between the cooling passage means 26 and the housing passage 22' when a valve closure unit 35 of the thermostat construction 24 is disposed in its closed condition by having an outer peripheral edge 36 of an annular metallic valve member 37 disposed against an internal peripheral surface 38 of the annular valve seat surface 30 as illustrated in FIG. 1. However, when the valve member 35 is moved away from the valve seat surface 38 as illustrated in FIG. 3 in a manner hereinafter set forth, coolant from the coolant passage 26 of the engine block 25 is adapted to pass through the open valve unit 29 to flow out of the end 32 thereof into the housing passage 22' of the housing means 21 and, thus, out through the outlet 23 thereof to the radiator 27 for the reasons previously set forth, the amount of coolant flow being permitted to pass through the thermostat construction 24 being determined by the degree of opening of the valve member 35 relative to the valve seat unit 29.

The thermostat construction 24 also comprises a temperature responsive device that is generally indicated by the reference numeral 39 and comprises a cylinder member 40 and a piston member 41 having a portion thereof (not shown) disposed within the cylinder member 40 and another portion 42 thereof extending out of one end 43 of the cylinder member 40, the cylinder member 40 containing a thermally responsive wax charge means or the like therein which is adapted to expand upon the temperature thereof reaching a certain temperature and thereby causing the piston 41 to extend further out of the cylinder member 40. Conversely, when the temperature of the wax charge means in the cylinder member 40 falls below a certain temperature, the piston member 41 is adapted to be retracted into the cylinder member 40 under the force of a spring means, such as the spring means 43' in a manner hereinafter set forth.

The wax charge means in the cylinder 40 of the thermostat construction 24 for the system 20 of this invention is adapted to have two different temperature ranges of operation thereof, so that when the temperature of the wax charge means reaches a first temperature range, the wax charge means causes the piston 41 to extend through a certain stroke thereof and thereafter, the wax charge means will then cause the piston 42 to extend through an additional stroke thereof when the temperature of the wax charge means reaches a second temperature range thereof in a manner well known in the art. For example, see the aforementioned Schwartz U.S. Pat. No. 3,381,469; the Schwartz U.S. Pat. No. 3,438,256 and the Jackson et al, U.S. Pat. No. 3,989,058, whereby these three patents are being incorporated into this disclosure by this reference thereto.

The valve closure unit 35 is fixed to the cylinder member 40 so as to move in unison therewith and the compression spring 43' always tends to move the valve closure unit 35 to its closed position by having one end 44 thereof bearing against the valve closure unit 35 and the other end 45 thereof bearing against a spring retainer means 46 that is carried by the valve seat unit 29 in a manner well known in the art.

The valve seat unit 29 also comprises a pair of metallic strap means 47 that tend to define an apex 48 at the upper end thereof as they converge toward each other and extend away from the open end 32 of the annular valve seat portion 30 as illustrated. In prior known thermostat constructions, the free end 49 of the piston member 41 normally bears against such apex 48 of the strap means 47 so as to cause the cylinder member 40 to move downwardly relative to the piston member 41 when the wax charge means in the cylinder member 40 expands for the reasons previously set forth to move the valve closure unit 35 away from the valve seat unit 29. However, in the thermostat construction 24 of this invention, the apex 48 of the strap means 47 has an opening 50 passing centrally therethrough and through which the piston member 41 extends so that the free end 49 of the piston member 41 is disposed outboard of the strap means 47 in the manner illustrated in FIG. 1 for a purpose hereinafter set forth whereby the strap means provide a guide for the movement of the piston member 41 through the opening 50 thereof.

The housing means 21 of this invention carries a second thermally responsive device that is generally indicated by the reference number 51 and comprises a cylinder member 52 that is fixed to the housing means 21 in any suitable manner and a piston member 53 which is adapted to move relative to the cylinder member 52 upon the wax charge means in the cylinder member 52 reaching a certain temperature so as to cause the piston member 53 to extend therefrom a certain distance as will be apparent hereinafter, the cylinder member 52 being fixed in an opening means 52' in the housing means 21 by a heat insulating member 54 as illustrated and being contained within a cup-shaped heat insulating member 55 that is fastened to a tubular extension 56 of the housing means 21 as illustrated.

The piston member 53 of the temperature responsive device 51 extends through an opening 57 in the housing means 21 that leads from the passage means 22' thereof to the larger opening means 52' as illustrated.

In this manner the temperature responsive device 51 is substantially heat insulated from the coolant that is permitted to pass into the passage means 22' of the housing means 21 by the heat insulating means 54 and 55 previously set forth so that the wax charge means within the cylinder member 52 is not dependent upon sensing the temperature of the coolant in the housing means 21. In contrast, an electrically operated heating means 58, such as a PTC thermistor that is self-limiting, is disposed around the cylinder member 52 as illustrated and is adapted to have electrical current pass therethrough by having a suitable electrical source (not shown) interconnected to the heater element 58 by suitable means 59 and 60 in a manner well known in the art. For example, see the aforementioned Noakes et al, U.S. Pat. No. 3,696,611; the Cook et al, U.S. Pat. No. 4,666,081 and the Nouvelle et al, U.S. Pat. No. 4,685,651, whereby these three patents are being incorporated into this disclosure by this reference thereto.

The temperature responsive devices 39 and 51 of the housing means 21 are so disposed in the housing means 21 that the piston members 41 and 53 thereof are disposed in spaced apart axially aligned relation and face each other for a purpose hereinafter set forth.

A cylindrical metallic rod means 61 has opposed ends 62 and 63 respectively provided with openings 64 and 65 therein that terminate in the rod means 61 to respectively define internal abutments or shoulders 66 and 67, the rod means 61 being of such a length that the same is adapted to receive the piston means 41 and 53 respectively in the openings 64 and 65 thereof so as to be held on the piston members 41 and 53 in the manner illustrated in FIG. 1 even when both of the piston members 41 and 53 are in their fully retracted position within their respective cylinder members 40 and 52.

Figure 2:
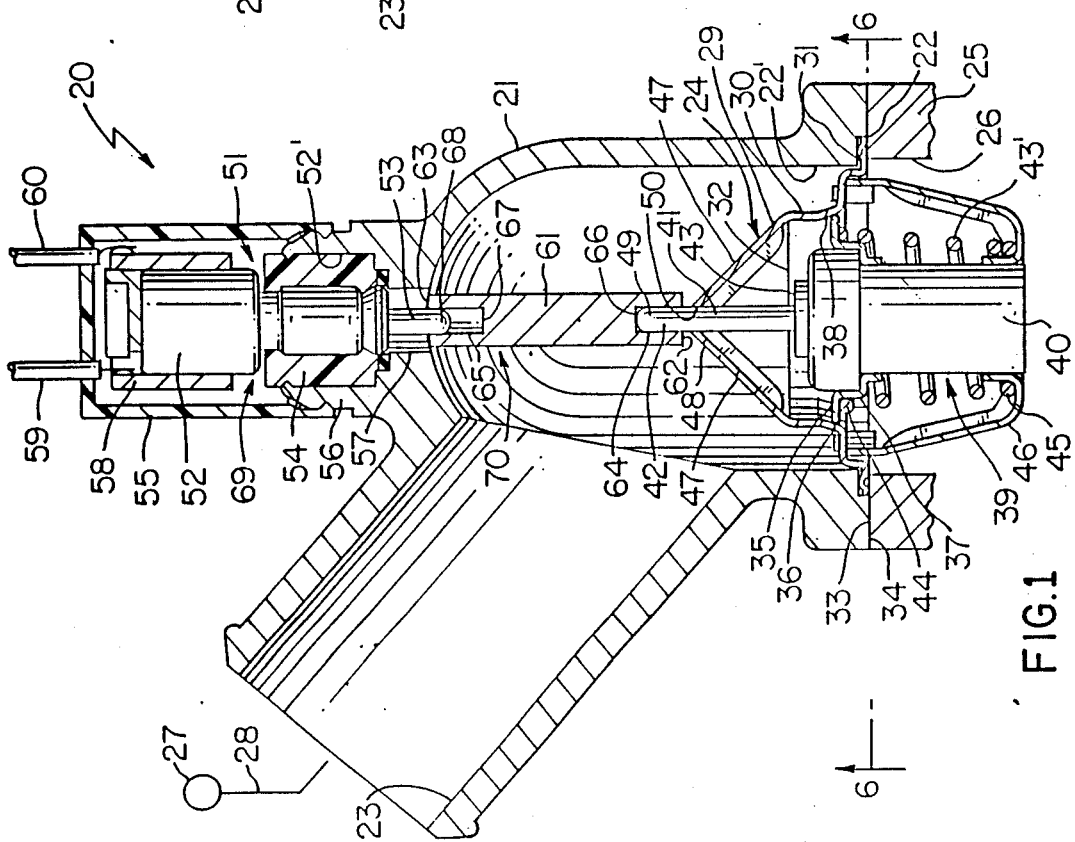
FIG. 2 is a view similar to FIG. 1 and illustrates the system in another operating condition thereof.

Also, the shoulders 66 and 67 of the rod means 61 have been so designed that the same are spaced from each other in such a manner that when the piston member 41 is extended out of the cylinder member 40 through the first range of temperature operation of the temperature responsive device 39, the free end 49 of the piston member 41 in its engagement with the shoulder 66 of the rod means 61 moves the rod means 61 upwardly from the position of FIG. 1 to the position of FIG. 2 to merely place the shoulder 67 of the rod means 61 against the free end 68 of the temperature responsive device 51 as long as the temperature responsive device 51 has its piston member 53 in the fully retracted position thereof which condition always exists as long as the heater means 58 is not being electrically operated.

In this manner, the valve closure unit 35 of the thermostat construction 24 remains closed so that no coolant can pass through the valve seat unit 29 thereof to the radiator means 27.

Thereafter, when the temperature responsive device 39 begins to operate in the second and higher temperature range of operation thereof, the rod means 61 can no longer be extended upwardly as the same has bottomed out against the end 68 of the fully retracted piston member 53 of the temperature responsive device 51 as shown (or the rod means 61 could be arranged to bottom out against a stationary surface 63' of the cylinder member 52 of the device 51) so that the cylinder member 40 of the temperature responsive device 39 must now move downwardly and carry the valve closure unit 35 therewith in opposition to the force of the compression spring 43' to begin to open the valve seat unit 29 as illustrated in FIG. 3, FIG. 3 illustrating the valve closure unit 35 having been moved to its fully open position by the temperature responsive device 39 having been heated through the upper end of its second temperature range.

Figure 4:
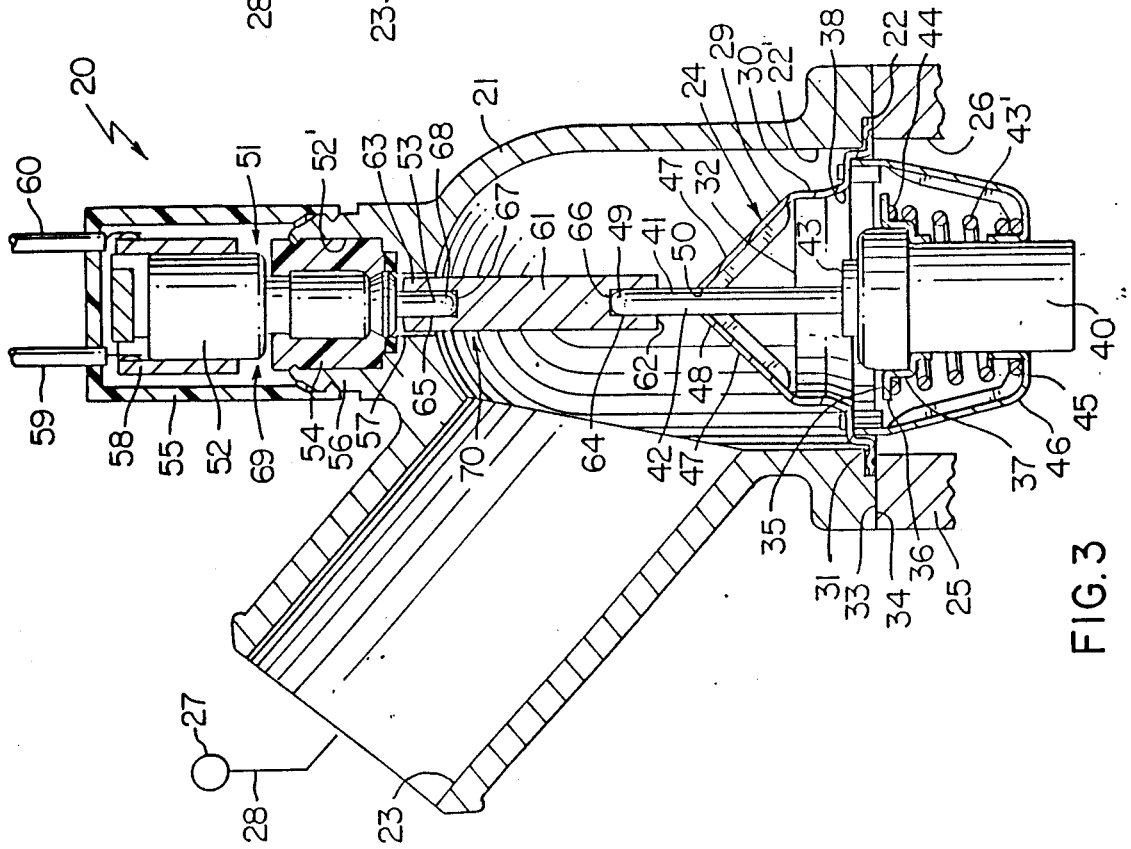
FIG. 4 is a view similar to FIG. 1 and illustrates the system in another operating condition thereof wherein the stop means thereof has been moved to another position and the valve closure unit is still in its closed position.
Figure 6:
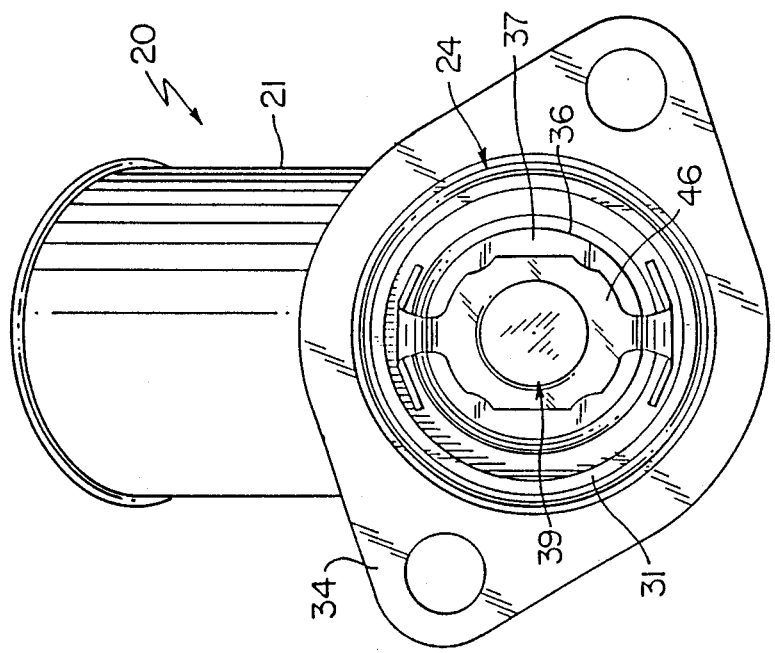
FIG. 6 is a view taken on line 6—6 of FIG. 1.

When the temperature responsive device 39 has its piston member 41 disposed in its fully retracted position as illustrated in FIG. 4 whereby the compression spring 43' is maintaining the valve closure unit 35 in its closed condition against the valve seat unit 29, operation of the heating element 58 of the temperature responsive device 51 causes the wax charge means within the cylinder member 52 to expand and extend the piston member 53 thereof downwardly to its fully extended condition as illustrated in FIG. 4 whereby the same takes up all of the lost motion provided by the opening 65 in the end 63 of the rod 61 so that the free end 67 of the piston member 53 is now disposed against the shoulder 67 of the rod means 61 while the other shoulder 66 thereof is disposed against the end 49 of the piston member 41 as illustrated in FIG. 4.

Figure 5:
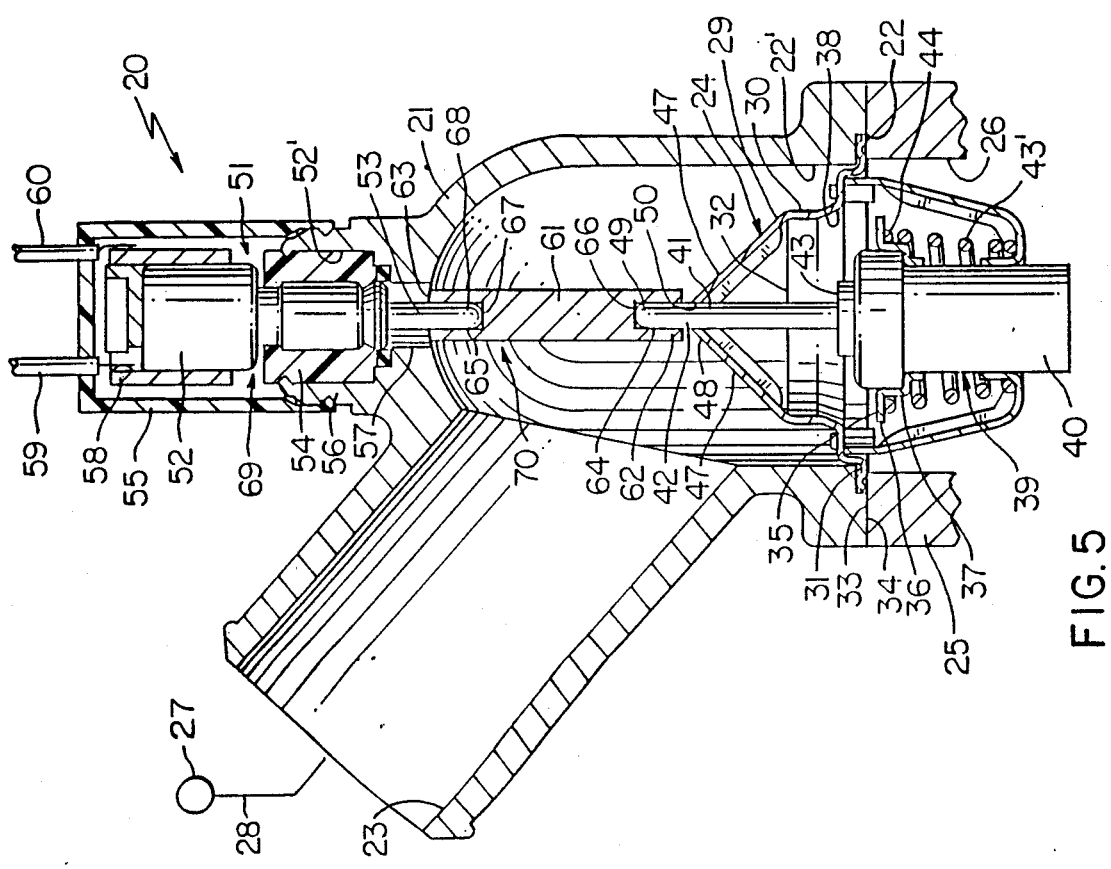
FIG. 5 is a view similar to FIG. 4 and illustrates the system in another operating condition thereof wherein the valve closure unit is in an open condition thereof.

Thereafter, should the temperature responsive device 38 now sense a temperature in the first temperature range of operation thereof so as to cause the wax charge means within the cylinder 40 to expand, the piston member 41 thereof cannot move upwardly so that the cylinder member 40 must now move downwardly and carry the valve closure unit 35 therewith in opposition to the force of the compression spring 43 to open the valve closure unit 35 relative to the valve seat unit 29 in the manner illustrated in FIG. 5.

Therefore, it can be seen that not only does the temperature responsive means 51 and heating element 58 act as a heat motor means that is generally indicated by the reference numeral 69 in the drawings, but also the temperature responsive device 51 and rod means 61 act as a stop means 70 for the piston member 41 of the temperature responsive device 39 so that the end 49 of the piston member 41 of the temperature responsive device 39 will engage against such stop means 70 at one position thereof as illustrated in FIGS. 4 and 5 when the heat motor means 69 is operating and against another position of the stop means 70 when the heat motor means 69 is not operating in the manner illustrated in FIGS. 1–3.

While the wax charge means within the cylinder 40 of the temperature responsive device 39 can operate at various temperature ranges as desired, one embodiment thereof can make an approximately 0.200 of an inch stroke of the piston member 41 when the wax charge means is sensing a temperature between approximately 160° F. and 180° F. and make an approximately 0.200 of an inch stroke between approximately 200° F. and 220° F., the location of the shoulders 66 and 67 on the rod means being arranged to accommodate the stroke of the piston member 41 during the inactive range of approximately 180° F. and 200° F. Such an arrangement will permit the engine cooling system 20 of this invention to be controlled at two different temperature ranges, one for summer driving and one for winter driving and/or one for heavy engine loads and one for normal engine loads.

For example, the computer of the vehicle containing the engine and system 20 of this invention can be programmed to select low or high temperature operation based on ambient temperature conditions so that during the summer months, it would operate the system 20 over the high temperature range (200° F. to 220° F.) of the thermostat construction 39 by not operating the heat motor means 69 and, during the winter months, it would operate the thermostat construction 39 over the low temperature range (160° F. to 180° F.) thereof merely by activating the heat motor means 69.

It is believed that by properly programming such an engine computer, the system 20 of this invention might virtually eliminate customer complaints of engine overheating or underheating and might even improve fuel economy and reduce emissions.

In any event, it can be seen that the engine cooling system 20 and parts thereof can be made by the method of this invention as previously set forth to operate in a manner now to be set forth.

With the heat motor means 69 operating so as to extend the piston member 53 of the temperature responsive device 51 in the manner illustrated in FIGS. 4 and 5, it can be seen that the temperature responsive device 39 will open the valve closure unit 35 away from the valve seat unit 29 when the temperature of the wax charge means within the cylinder 40 thereof reaches the first and lower temperature range of operation thereof because the stop means 70 will not permit the piston member 41 of the temperature responsive device 39 to extend upwardly and thereby causes the cylinder member 40 to move downwardly in the manner illustrated in FIG. 5. Thus the engine coolant will be circulated through the housing means 21 depending upon the temperature being sensed by the temperature responsive device 39 in the first and lower temperature range thereof. Of course, as the temperature being sensed by the temperature responsive device 39 falls, the wax charge means contracts so that the cylinder member 40 will move the valve closure unit 35 toward the valve seat unit 29 by the force of the spring means 43'.

However, when the heat motor means 69 is not operating, the piston member 53 thereof will be retracted within the cylinder 52 to the position illustrated in FIGS. 1–3 so that when the temperature responsive device 39 senses the temperature of the coolant in the engine block 25 through the first temperature range thereof, the piston member 41 will move upwardly relative to the cylinder member 40 and position the stop means 70 at the position illustrated in FIG. 2 without causing the valve closure unit 35 to move away from the valve seat unit 29 so that no coolant can be circulated to the radiator 27 during the sensing of the temperature through the first temperature range of the thermostat construction 24. However, as the temperature sensed by the temperature responsive device 39 now increases into the second temperature range of operation thereof, the piston member 41 cannot be further extended upwardly so that the cylinder member 40 now moves downwardly and carries the valve closure unit 35 therewith in opposition to the force of the compression spring 43' to open the valve closure unit 35 relative to the valve seat unit 29.

Of course, in the operation of the system 20 of this invention, as the temperature thereafter falls, the valve closure unit 35 is moved closer to the valve seat unit 29 to completely close off the same when the temperature falls to the lower end of the particular temperature range of operation that is effective to cause closing of the valve closure unit 35 relative to the valve seat unit 29.

Therefore, it can be seen that this invention not only provides a new engine cooling system and method of making the same, but also this invention provides new structure for an engine cooling system and methods of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a structure for controlling an engine cooling system, said structure comprising a housing means having an inlet and an outlet, and a thermostat construction disposed in said housing means between said inlet and said outlet for controlling the degree of fluid flow therebetween, said thermostat construction comprising a valve seat unit, a valve closing unit for opening and closing said valve seat unit, spring means operatively interconnected to said valve closure unit to tend to close the same against said valve seat unit, and a temperature responsive device comprising a piston member and a cylinder member that are adapted to provide relative movement therebetween when the device senses certain temperatures, said cylinder member being interconnected to said valve closure unit to move the same in unison therewith in opposition to the force of said spring means when said piston member is fixed from movement relative to said housing means, a movable stop means carried by said housing means and having a plurality of different set positions relative to said piston member so as to be engaged by said piston member at the particular set position of said stop means and thereby fix said piston member to said housing means at that particular set position so that once said piston member has been moved against said stop means by said device sensing a particular temperature, said device will cause said cylinder member to move to open said valve closure unit relative to said valve seat unit when said device senses a certain higher temperature than said particular temperature, said stop means comprising a second piston member that is carried by said housing means, said stop means comprising moving means for moving said second piston member to different set positions thereof, the improvement wherein said piston members face each other in spaced apart axially aligned relation and wherein said stop means comprises a rod means interconnecting the piston members, said rod means having means for removably attaching the rod means to the piston members, and said rod means having means for providing a lost-motion connection between said piston members and said rod means in one of said set positions of the second piston member.

2. A structure as set forth in claim 1 wherein said rod means has opposed ends respectively provided with opening means therein that respectively receive said piston members therein in all operating positions of said structure.

3. A structure as set forth in claim 2 wherein said opening means of said rod means respectively define internal shoulder means in said rod means, said piston member of said temperature responsive device engaging its respective shoulder means at said different set positions of said stop means.

4. A structure as set forth in claim 1 wherein said temperature responsive device is adapted to control the coolant flow through said system over a first temperature range thereof when said stop means is in a first certain set position thereof and to control the coolant flow through said system over a second temperature range thereof when said stop means is in a second certain set position thereof.

5. A structure as set forth in claim 4 wherein said first temperature range is approximately 160° F. to approximately 180° F. and wherein said second temperature range is approximately 200° F. to approximately 220° F.

* * * * *

UNITED STATES PATENT AND TRADEMARK OFFICE
CERTIFICATE OF CORRECTION

PATENT NO. : 4,961,530
DATED : October 9, 1990
INVENTOR(S) : Joseph P. Wagner

It is certified that error appears in the above—identified patent and that said Letters Patent is hereby corrected as shown below:

On the title page:
The portion of the term of this patent subsequent to January 2, 2007, has been disclaimed.

Signed and Sealed this

Twelfth Day of October, 1993

Attest:

BRUCE LEHMAN

*Attesting Officer*  *Commissioner of Patents and Trademarks*